(12) United States Patent
Puente Pestaña et al.

(10) Patent No.: US 12,388,803 B2
(45) Date of Patent: Aug. 12, 2025

(54) TRAFFIC MANAGEMENT WITH ASYMMETRIC TRAFFIC ENCRYPTION IN 5G NETWORKS

(71) Applicant: Telefonaktiebolaget LM Ericsson (publ), Stockholm (SE)

(72) Inventors: Miguel Angel Puente Pestaña, Madrid (ES); Antonio Cañete Martinez, Madrid (ES); Miguel Angel Muñoz De La Torre Alonso, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 189 days.

(21) Appl. No.: 18/280,070

(22) PCT Filed: Mar. 1, 2022

(86) PCT No.: PCT/EP2022/055086
§ 371 (c)(1),
(2) Date: Sep. 1, 2023

(87) PCT Pub. No.: WO2022/184681
PCT Pub. Date: Sep. 9, 2022

(65) Prior Publication Data
US 2024/0146702 A1    May 2, 2024

(30) Foreign Application Priority Data
Mar. 1, 2021   (EP) .................................... 21382170

(51) Int. Cl.
*H04L 9/40*    (2022.01)
*H04W 12/033*   (2021.01)

(52) U.S. Cl.
CPC ....... *H04L 63/0442* (2013.01); *H04W 12/033* (2021.01)

(58) Field of Classification Search
CPC ............. H04L 63/0442; H04L 63/0464; H04L 63/062; H04W 12/033; H04W 12/04
See application file for complete search history.

(56) References Cited

U.S. PATENT DOCUMENTS

| | | | |
|---|---|---|---|
| 2011/0154019 A1 | 6/2011 | Wang | |
| 2023/0092245 A1* | 3/2023 | Saroiu | H04W 12/03 726/22 |
| 2023/0396455 A1* | 12/2023 | Wane | H04L 9/50 |

FOREIGN PATENT DOCUMENTS

| | | |
|---|---|---|
| CN | 110519750 A | 11/2019 |
| CN | 112153641 A | 12/2020 |
| EP | 3522473 A1 | 8/2019 |

OTHER PUBLICATIONS

3GPP TS 29.522 V16.5.0, "3rd Generation Partnership Project; Technical Specification Group Core Network and Terminals; 5G System; Network Exposure Function Northbound APIs; Stage 3 (Release 16)", 3GPP TS 29.522 V16.5.0, Sep. 2020.

* cited by examiner

*Primary Examiner* — Izunna Okeke
(74) *Attorney, Agent, or Firm* — Sage Patent Group

(57) ABSTRACT

A network operator node (17) is provided. The network operator node (17) includes processing circuitry (42) configured to receive data traffic that is encrypted using one of an uplink and downlink public cryptographic key, decrypt the data traffic using one of an uplink and downlink private cryptographic key, apply at least a first traffic management action to the decrypted data traffic, after applying at least the first traffic management action, encrypt the data traffic using one of an application server, AS, public cryptographic key and an application client, AC, public cryptographic key where the AS public cryptographic key is associated with an AS private cryptographic key that remains unshared with the network operator node (17), and the AC public cryptographic key is associated with an AC private cryptographic key that remains unshared with the network operator node (17).

19 Claims, 9 Drawing Sheets

TRAFFIC MANAGEMENT WITH ASYMMETRIC TRAFFIC ENCRYPTION IN 5G NETWORKS

PRIORITY CLAIM

This application is a national stage application of International Patent Application No. PCT/EP2022/055086, filed Mar. 1, 2022, which claims priority to European Patent Application No. 21382170.5, Mar. 1, 2021, the disclosure disclosures of which are hereby incorporated in their entirety by reference.

TECHNICAL FIELD

The present disclosure relates generally to a network operator node, a method implemented by the network node, a user plane function (UPF) node. The present disclosure relates to wireless communication and in particular to Traffic Management (TM) when the traffic is encrypted using, for example, asymmetric encryption.

BACKGROUND

Reference Architecture

FIG. 1 is a diagram of a 5$^{th}$ Generation (5G, also referred to as New Radio (NR)) reference architecture 100 as defined by Third Generation Partnership Project (3GPP).

Some aspects of 5G network architecture may include one or more of the following:
- Application Function (AF) 101
- Network Exposure Function (NEF) 103
- Policy Control Function (PCF) 105
- Network Resource Function (NRF) 108
- Session Management Function (SMF) 110
- User Plane Function (UPF) 113
- Network Slice Selection Function (NSSF) 115
- Unified Data Management (UDM) 118
- Access & Mobility Management Function (AMF) 120
- Authentication Server Function (AUSF) 122
- User Equipment (UE) 123
- (Radio) Access Network ((R)AN) 125
- Data Network (DN) 128

AF 101

The AF 101 interacts with the 3GPP Core Network through the NEF 103.

NEF 103

The NEF 103 supports different functionality and the NEF 103 acts as an entry point for external AF 101 into the network operator's network.

PCF 105

The PCF 105 supports a unified policy framework to govern the network behavior.

NRF 108

The NRF 108 supports registration and discovery procedures.

SMF 110

The SMF 110 supports different functionality, e.g., Session Establishment, modify and release, and policy related functionalities like termination of interfaces towards Policy control functions, charging data collection, support of charging interfaces and control and coordination of charging data collection at UPF 113. Specifically, the SMF 110 receives PCC rules from PCF 105 and configures UPF 113 accordingly through N4 reference point, e.g. the Packet Forwarding Control Protocol (PFCP) protocol, as follows:

SMF 110 controls the packet processing in the UPF 113 by establishing, modifying or deleting PFCP Sessions and by provisioning i.e., adding, modifying or deleting, Packet Detection Rules (PDR), Forwarding Action Rules (FAR), Quality Enforcement Rules (QER) and/or Usage Reporting Rules (URR) per PFCP session, where a PFCP session may correspond to an individual Protocol Data Unit (PDU) session or a standalone PFCP session not tied to any PDU session.

Each PDR contains a Packet Detection Information (PDI) specifying the traffic filters or signatures against which incoming packets are matched. Each PDR is associated to the following rules providing the set of instructions to apply to packets matching the PDI:
- one FAR, which contains instructions related to the processing of the packets, specifically forward, redirect, duplicate, drop or buffer the packet with or without notifying the Control Plane (CP) function about the arrival of a Downlink (DL) packet.
- zero, one or more QERs, which contains instructions related to the Quality of Service (QoS) enforcement of the traffic;
- zero, one or more URRs, which contains instructions related to traffic measurement and reporting.

UPF 113

The UPF 113 supports handling of user plane traffic based on the rules received from the SMF such as for packet inspection through PDRs and different enforcement actions, e.g., traffic steering, QoS, Charging/Reporting through FARs, QERs, URRs.

Traffic Encryption and Network Management

Traffic encryption is growing significantly in mobile networks and at the same time, the encryption mechanisms are growing in complexity. Most applications today are not based on Hypertext Transfer Protocol (HTTP) cleartext, but instead they are based on HTTPS using Transport Layer Security (TLS). Additionally, a significant part of the traffic is now based on QUIC transport. In the future, most software applications may be based on QUIC transport.

Asymmetric Encryption

Public-key cryptography, or asymmetric cryptography, is a cryptographic system that uses pairs of keys: public keys, which may be widely disseminated, and private keys, which are known only to the owner/entity. The generation of such keys depends on cryptographic algorithms based on mathematical problems to produce one-way functions. Effective security only requires keeping the private key private while the public key can be openly distributed without compromising security.

In such a system, any entity can encrypt a message using the receiver's/owner's public key, but that encrypted message can only be decrypted with the receiver's/owner's private key.

Robust authentication is also possible. A sender can combine a message with a private key to create a short digital signature on the message. Any entity with the sender's corresponding public key can combine the same message and the supposed digital signature associated with it to verify whether the signature was valid, i.e., made by the owner of the corresponding private key.

Public key algorithms are fundamental security ingredients in modern cryptosystems, applications and protocols assuring the confidentiality, authenticity and non-repudiability of electronic communications and data storage. They underpin various Internet standards, such as TLS, Secure/Multipurpose internet Mail Extensions (S/MIME), Pretty Good Privacy (PGP), and Gnu Privacy Guard (GPG). Some public key algorithms provide key distribution and secrecy, e.g., Diffie-Hellman key exchange, some provide digital signatures, e.g., Digital Signature Algorithm, and some provide both, e.g., RSA. Compared to symmetric encryption, asymmetric encryption is slow for many purposes. Today's cryptosystems, such as TLS, Secure Shell, use both symmetric encryption and asymmetric encryption.

TLS

TLS, a successor of Secure Sockets Layer (SSL), is a protocol for encrypting communications over a network. TLS uses both asymmetric encryption and symmetric encryption. During a TLS handshake, the client and server agree upon new keys to use for symmetric encryption, called "secret keys." Each new communication session will start with a new TLS handshake and use new secret keys.

The TLS handshake itself makes use of asymmetric encryption for security while the two sides generate the secret keys, and in order to authenticate the identity of the website's origin server.

QUIC

QUIC is a User Datagram Protocol (UDP-based, stream-multiplexing, encrypted transport protocol. QUIC is basically a UDP based replacement for Transmission Control Protocol (TCP). QUIC is under the final steps of standardization at Internet Engineering Task Force (IETF) and relies on TLS 1.3.

Some Issues with Existing Systems

There are two conflicting aspects regarding traffic encryption in mobile networks:

1) Applications demand privacy and security, so they are using encrypted traffic more and more. It is expected that in a few years practically all internet traffic will be encrypted.
2) Applications demand Traffic Management actions from network operators where the actions require traffic visibility, for example:
   Content enrichment, e.g., HTTP content enrichment, where the network operator adds information, e.g., Radio Access Technology (RAT) Type, International Mobile Subscriber Identity (IMSI), Mobile Station Integrated Services Digital Network (MSISDN, towards the content provider, e.g. application server (AS).
   Parental control, e.g., in order to block traffic to forbidden sites.
   Traffic redirection, e.g., HTTP based redirection, e.g., in Edge Computing scenarios to redirect the user towards an Edge Cloud, or to redirect the user towards specific servers upon specific events, e.g., when the subscriber's quota is expired it can be redirected towards a quota refill service
   Etc.

In existing systems, it may not be possible to satisfy both demands for privacy/security using encrypted traffic and traffic visibility at the same time, since to apply any of the above traffic management actions, the network operator needs to be able to "see" the traffic, which is not possible as the traffic is encrypted by the application. Further, existing systems lack collaboration with respect to visibility of content between the network operator and content provider such as to further exacerbate the traffic visibility issue.

Therefore, there is a need to at least mitigate or solve this issue.

SUMMARY

An objective of embodiments herein is therefore to obviate at least one of the above disadvantages and to provide improved traffic management.

Some embodiments advantageously provide a method and system for traffic management when the traffic is encrypted using, for example, asymmetric encryption.

One or more embodiments described herein provide a mechanism which at least in part at least one problem with existing systems where the mechanism is based on an extension of the exposure policy framework. In one or more embodiments, only public keys are exchanged among the different parties/entities. Private keys are never exchanged and are always kept by the network owner. This collaborative solution allows the network operator to detect and decrypt the subscriber traffic for a certain application and to apply the one or more corresponding traffic management actions, e.g., redirection, content enrichment, parental control, etc., in a low complexity and efficient manner when the traffic is encrypted using asymmetric encryption.

Two example mechanisms are described herein:

In one mechanism, the application requests to the network operator/network operator node the public keys to encrypt the Uplink (UL) and DL traffic. In turn the application provides the public keys to encrypt the traffic towards the Wireless Device (WD) and AS in the request for the one or more TM actions.

In another mechanism, the network operator/network operator node triggers the key generation process at PDU session establishment and passes to the application the public keys to encrypt the UL and DL traffic. In turn the application provides the public keys to encrypt the traffic towards the WD and AS during this procedure, before the application requests the TM actions.

According to one aspect of the disclosure, the objective is achieved by a network operator node configured to communicate with a WD is provided. The network operator node includes processing circuitry configured to: share an uplink public cryptographic key and a downlink public cryptographic key with a content provider node where the uplink public cryptographic key being associated with an uplink private cryptographic key, and the downlink public cryptographic key is associated with a downlink private cryptographic key. The process circuitry is further configured to receive data traffic that is encrypted using one of the uplink and downlink public cryptographic key, decrypt the data traffic using one of the uplink and downlink private cryptographic key, apply at least a first traffic management action to the decrypted data traffic, after applying at least the first traffic management action, encrypt the data traffic using one of an AS public cryptographic key and an application client (AC) public cryptographic key where the AS public cryptographic key is associated with an AS private cryptographic key that remains unshared with the network operator node and the AC public cryptographic key is associated with an AC private cryptographic key that remains unshared with the network operator node, and cause transmission of the data traffic that is encrypted by one of the AS public cryptographic key and AC public cryptographic key.

According to one or more embodiments of this aspect, at least the first traffic management action is configured for the WD for a predefined software application. According to one or more embodiments of this aspect, at least the first traffic management action includes modifying at least one of a property and content associated with the data traffic. According to one or more embodiments of this aspect, at least the first traffic management action includes at least one of content enrichment, parental control and redirection, content filtering and application-based charging and monitoring.

According to one or more embodiments of this aspect, the processing circuitry is further configured to receive, from the content provider node, a request for public cryptographic keys for performing at least the first traffic management action where the sharing of the uplink public cryptographic key and downlink public cryptographic key is performed based at least in part on the request for public cryptographic keys. According to one or more embodiments of this aspect, the processing circuitry is further configured to receive, from the content provider node, a request requiring the network operator node to apply at least the first traffic management action where the request includes an AS cryptographic public key and an AC public cryptographic key. According to one or more embodiments of this aspect, the request to apply at least the first traffic management action is received after the request for the public cryptographic keys.

According to one or more embodiments of this aspect, the processing circuitry is further configured to receive an onboarding request from the content provider node where the sharing of the uplink public cryptographic key and downlink public cryptographic key is performed based at least in part on the received onboarding request. According to one or more embodiments of this aspect, the processing circuitry is further configured to: receive a key request for an AS public cryptographic key and an AC public cryptographic key; send the key request to the content provider node to generate the AS public cryptographic key and AC public cryptographic key; receive a response to the key request, the response including the AS public cryptographic key and AC public cryptographic key; and transmit the AS public cryptographic key and AC public cryptographic key to a key generation and store entity for retrieval. According to one or more embodiments of this aspect, the processing circuitry is further configured to receive, from the content provider node, a request to apply at least the first traffic management action where the request includes an application identifier, WD identifier and an indication of at least the first traffic management action being requested.

According to one or more embodiments of this aspect, the processing circuitry is further configured to retrieve the downlink public cryptographic key, uplink public cryptographic key, AS public cryptographic key, AC public cryptographic key using the application identifier and WD identifier. According to one or more embodiments of this aspect, the network operator node includes a UPF logical node, SMF logical node, PCF logical node, and a NEF logical node.

According to another aspect of the disclosure, the objective is achieved by a UPF node, that is part of a network operator node and configured to communicate with a WD is provided. The UPF node includes processing circuitry configured to receive an uplink private cryptographic key and a downlink private cryptographic key from a key generation and store entity where the uplink private cryptographic key is associated with an uplink public cryptographic key and the downlink private cryptographic key is associated with a downlink public cryptographic key. The processing circuitry is further configured to receive data traffic that is encrypted using one of the uplink and downlink public cryptographic key, decrypt the data traffic using one of the uplink and downlink private cryptographic key, apply at least a first traffic management action to the decrypted data traffic, after applying at least the first traffic management action, encrypt the data traffic using one of an AS public cryptographic key and AC public cryptographic key that is shared with a content provider node where the AS public cryptographic key is associated with an AS private cryptographic key that is remains unshared with the network operator node and the AC public cryptographic key is associated with an AC private cryptographic key that remains unshared with the network operator node, and cause transmission of the data traffic that is encrypted by one of the AS public cryptographic key and AC public cryptographic key.

According to one or more embodiments of this aspect, at least the first traffic management action is configured for the WD for a predefined software application. According to one or more embodiments of this aspect, the uplink public cryptographic key and the downlink public cryptographic key are shared with a content provider node. According to one or more embodiments of this aspect, at least the first traffic management action includes modifying at least one of a property and content associated with the data traffic. According to one or more embodiments of this aspect, at least the first traffic management action includes at least one of content enrichment, parental control and redirection, content filtering and application-based charging and monitoring.

According to another aspect of the disclosure, the objective is achieved by a method implemented by a network operator node that is configured to communicate with a WD is provided. An uplink public cryptographic key and a downlink public cryptographic key are shared with a content provider node where the uplink public cryptographic key is associated with an uplink private cryptographic key, and the downlink public cryptographic key is associated with a downlink private cryptographic key. Data traffic that is encrypted using one of the uplink and downlink public cryptographic key is received. The data traffic is encrypted using one of the uplink and downlink private cryptographic key. At least a first traffic management action is applied to the decrypted data traffic. After applying at least the first traffic management action, the data traffic is encrypted using one of an AS public cryptographic key and AC public cryptographic key where the AS public cryptographic key is associated with an AS private cryptographic key that remains unshared with the network operator node and the AC public cryptographic key is associated with an AC private cryptographic key that remains unshared with the network operator node. Transmission is caused of the data traffic that is encrypted by one of the AS public cryptographic key and AC public cryptographic key.

According to one or more embodiments of this aspect, at least the first traffic management action is configured for the WD for a predefined software application. According to one or more embodiments of this aspect, at least the first traffic management action includes modifying at least one of a property and content associated with the data traffic. According to one or more embodiments of this aspect, at least the first traffic management action includes at least one of content enrichment, parental control and redirection, content filtering and application-based charging and monitoring.

According to one or more embodiments of this aspect, a request for public cryptographic keys for performing at least the first traffic management action is received from the content provider node where the sharing of the uplink public cryptographic key and downlink public cryptographic key is performed based at least in part on the request for public cryptographic keys. According to one or more embodiments of this aspect, a request requiring the network operator node to apply at least the first traffic management action is received from the content provider node where the request including an AS cryptographic public key and an AC public cryptographic key. According to one or more embodiments of this aspect, the request to apply at least the first traffic management action is received after the request for the public cryptographic keys.

According to one or more embodiments of this aspect, an onboarding request is received from the content provider node where the sharing of the uplink public cryptographic key and downlink public cryptographic key is performed based at least in part on the received onboarding request. According to one or more embodiments of this aspect, a key request for an AS public cryptographic key and an AC public cryptographic key is received. The key request is sent to the content provider node to generate the AS public cryptographic key and AC public cryptographic key. A response to the key request is received where the response includes the AS public cryptographic key and AC public cryptographic key. The AS public cryptographic key and AC public cryptographic key is transmitted to a key generation and store entity for retrieval. According to one or more embodiments of this aspect, a request to apply at least the first traffic management action is received from the content provider node where the request includes an application identifier, WD identifier and an indication of at least the first traffic management action being requested.

According to one or more embodiments of this aspect, the downlink public cryptographic key, uplink public cryptographic key, AS public cryptographic key, AC public cryptographic key are retrieved using the application identifier and WD identifier. According to one or more embodiments of this aspect, the network operator node includes a UPF logical node, SMF logical node, PCF logical node, and a NEF logical node.

According to another aspect of the disclosure, the objective is achieved by a method implemented by a UPF node, that is part of a network operator node and configured to communicate with a WD is provided. An uplink private cryptographic key and a downlink private cryptographic key is received from a key generation and store entity where the uplink private cryptographic key is associated with an uplink public cryptographic key and the downlink private cryptographic key is associated with a downlink public cryptographic key. Data traffic that is encrypted using one of the uplink and downlink public cryptographic key is received. The data traffic is encrypted using one of the uplink and downlink private cryptographic key. At least a first traffic management action is applied to the decrypted data traffic. After applying at least the first traffic management action, the data traffic is encrypted using one of an AS public cryptographic key and AC public cryptographic key that is shared with a content provider node where the AS public cryptographic key is associated with an AS private cryptographic key that is remains unshared with the network operator node and the AC public cryptographic key is associated with an AC private cryptographic key that remains unshared with the network operator node. Transmission is caused of the data traffic that is encrypted by one of the AS public cryptographic key and AC public cryptographic key.

According to one or more embodiments of this aspect, at least the first traffic management action is configured for the WD for a predefined software application. According to one or more embodiments of this aspect, the uplink public cryptographic key and the downlink public cryptographic key are shared with a content provider node. According to one or more embodiments of this aspect, at least the first traffic management action includes modifying at least one of a property and content associated with the data traffic. According to one or more embodiments of this aspect, at least the first traffic management action includes at least one of content enrichment, parental control and redirection, content filtering and application-based charging and monitoring. At least the first traffic management action includes at least one of content enrichment, parental control and redirection.

According to another aspect of the disclosure, the objective is achieved by a computer readable medium is provided. The computer readable medium includes instructions which, when executed by a processor of network operator node, cause the processor to share an uplink public cryptographic key and a downlink public cryptographic key with a content provider node where the uplink public cryptographic key is associated with an uplink private cryptographic key and the downlink public cryptographic key is associated with a downlink private cryptographic key. The processor is further caused to receive data traffic that is encrypted using one of the uplink and downlink public cryptographic key, decrypt the data traffic using one of the uplink and downlink private cryptographic key, apply at least a first traffic management action to the decrypted data traffic, after applying at least the first traffic management action, encrypt the data traffic using one of an AS public cryptographic key and AC public cryptographic key where the AS public cryptographic key is associated with an AS private cryptographic key that remains unshared with the network operator node and the AC public cryptographic key is associated with an AC private cryptographic key that remains unshared with the network operator node, and cause transmission of the data traffic that is encrypted by one of the AS public cryptographic key and AC public cryptographic key.

According to another aspect of the disclosure, the objective is achieved by a computer readable medium is provided. The computer readable medium includes instructions which, when executed by a processor of UPF node, cause the processor to receive an uplink private cryptographic key and a downlink private cryptographic key from a key generation and store entity where the uplink private cryptographic key is associated with an uplink public cryptographic key and the downlink private cryptographic key is associated with a downlink public cryptographic key. The processor is further caused to receive data traffic that is encrypted using one of the uplink and downlink public cryptographic key, decrypt the data traffic using one of the uplink and downlink private cryptographic key, apply at least a first traffic management action to the decrypted data traffic, after applying at least the first traffic management action, encrypt the data traffic using one of an AS public cryptographic key and AC public cryptographic key that is shared with a content provider node where the AS public cryptographic key is associated with an AS private cryptographic key that is remains unshared with a network operator node and the AC public cryptographic key is associated with an AC private cryptographic key that remains unshared with the network operator node, and cause transmission of the data traffic that is encrypted by the AS public cryptographic key and AC public cryptographic key.

One or more embodiments described herein provide one or more of the following advantages:
  The allow the network operator/network operator node to support traffic management actions, e.g., redirection, content enrichment, parental control, for the subscriber's traffic in a low complexity and efficient manner.
  They allow the network operator/network operator node to detect the traffic from the application, especially when the traffic is encrypted by asymmetric encryption.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
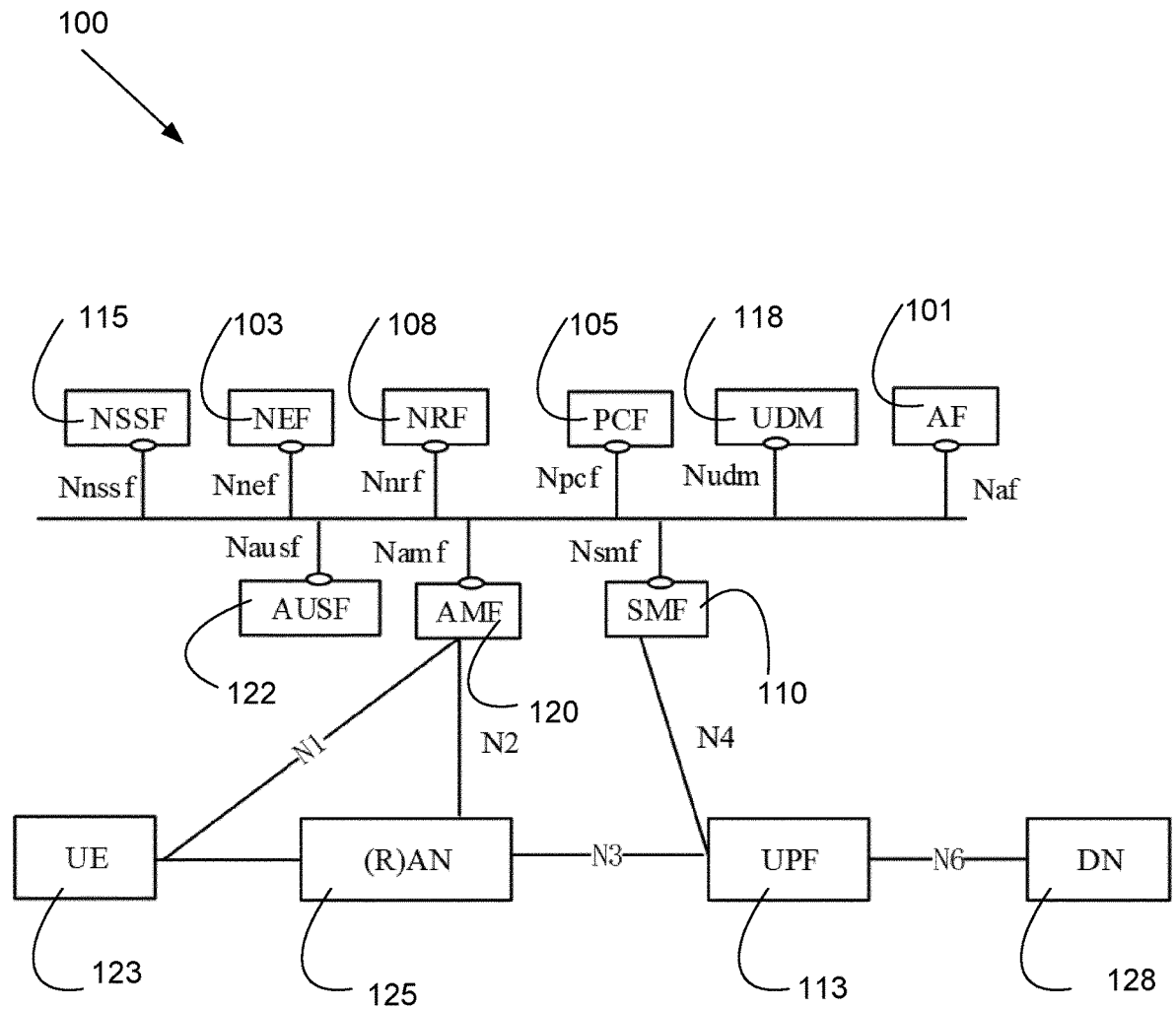
FIG. 1 is a diagram of a non-roaming 5G network architecture.

One or more embodiments described herein address at least the problem of traffic visibility when the application uses asymmetric traffic encryption, i.e., when the transmitter uses a public key to encrypt traffic and the receiver uses a private key to decrypt the traffic.

Before describing in detail exemplary embodiments, it is noted that the embodiments reside primarily in combinations of apparatus components and processing steps related to traffic management when the traffic is encrypted using, for example, asymmetric encryption. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node, e.g., mobile management entity (MME), self-organizing network (SON) node, a coordinating node, positioning node, MDT node, etc., an external node, e.g., 3rd party node, a node external to the current network, nodes in distributed antenna system (DAS), a spectrum access system (SAS) node, an element management system (EMS), etc. The term "radio node" used herein may be used to also denote a WD such as a a radio network node.

In some embodiments, the non-limiting terms WD or a UE are used interchangeably. The WD herein can be any type of wireless device capable of communicating with a network node or another WD over radio signals, such as WD. The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, eNB, Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or NR, may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a WD or a network node may be distributed over a plurality of WDs and/or network nodes. In other words, it is contemplated that the functions of the network node and WD described herein are not limited to performance by a single physical device and, in fact, can be distributed among several physical devices.

Unless otherwise defined, all terms, including technical and scientific terms, used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments are directed to traffic management when the traffic is encrypted using, for example, asymmetric encryption.

Figure 2:
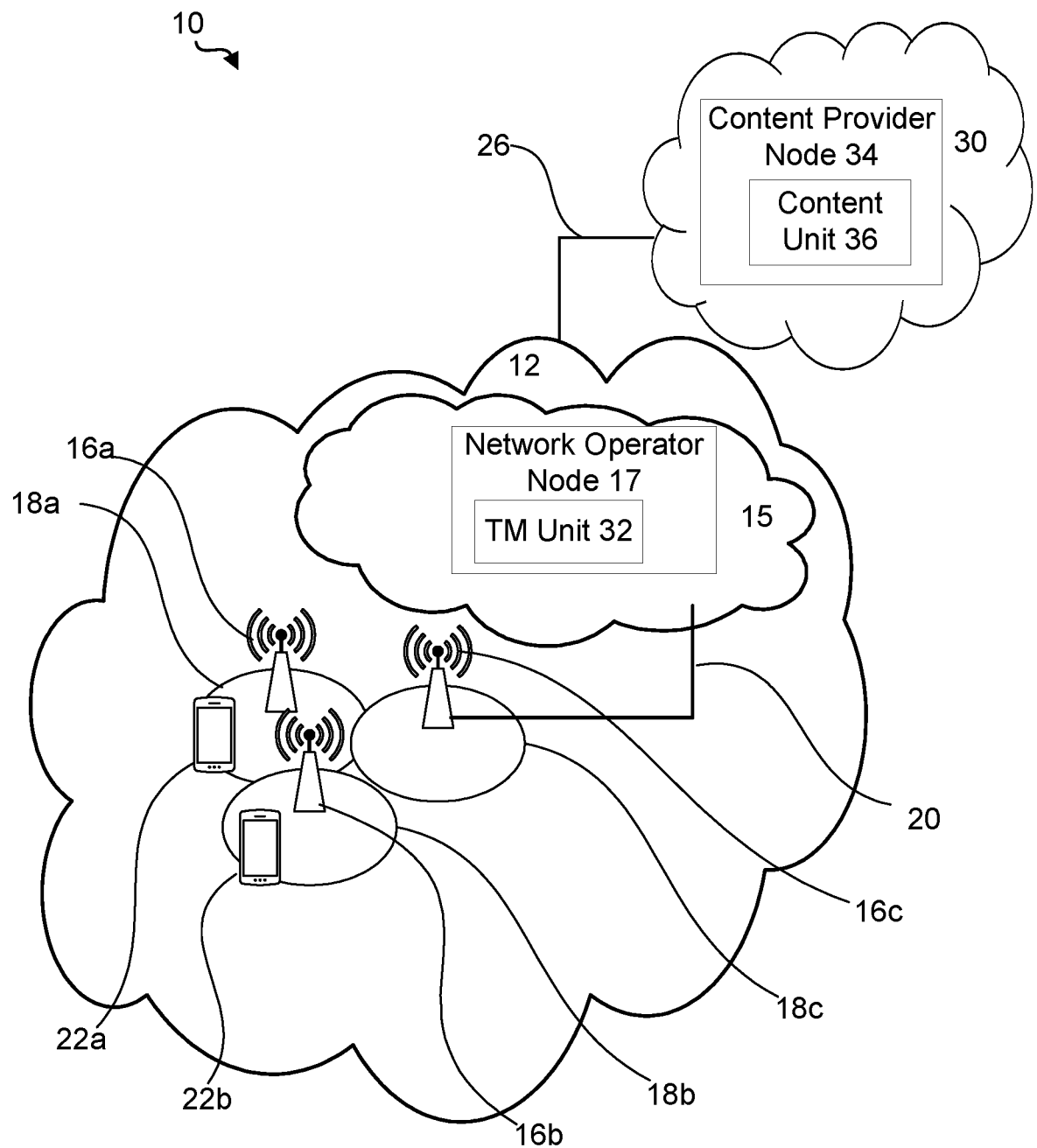
FIG. 2 is a schematic diagram of an exemplary network architecture illustrating a communication system.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a network operator network 14. The access network 12 comprises a plurality of network nodes 16a, 16b, 16c, referred to collectively as network nodes 16, such as NBs, eNBs, gNBs or other types of wireless access points, each defining a corresponding coverage area 18a, 18b, 18c, referred to collectively as coverage areas 18. In particular, network node 16 may include a radio interface (not shown) that may be formed as or may include, for example, one or more Radio Frequency (RF) transmitters, one or more RF receivers, and/or one or more RF transceivers for communicating with one or more WDs. The radio interface may include an array of antennas to radiate and receive signal carrying electromagnetic waves. Further, network node 16 may include a communication interface (not shown) for communicating with network operator node 17.

Each network node 16a, 16b, 16c is connectable to the core network 15 over a wired or wireless connection 20. A first WD 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as WDs 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

Network operator network 14 includes one or more network operator nodes 17. For example, network operator nodes 17 may include one or more of the following logical and/or physical entities: UPF 113, SMF 110, PCF 105, Key Generation and Store entity, NEF 103, etc. as described herein. While one or more specific actions that are performed by one or more of these entities are described in detail herein, one or more of these entities may be logically grouped together such that the logical group is referred to as "network operator node 17" although specific actions for the network operator node 17 are performed by respective entities in the group as described herein such as with respect to FIGS. 6a-7b. Network operator node is configured to include TM unit 32 to perform one or more network operator node 17 functions as described herein such as with respect to traffic management when the traffic is encrypted using, for example, asymmetric encryption.

Access network 12 may be in communication with content provider network 30 via communication link 26. Content provider network 30 may include one or more content provider nodes 34 configured to provide content to one or more WDs 22 such as via network operator node 17 and network node 16. Content provider node 34 is configured to include content unit 36 which is configured to perform one or more content provider node 34 functions as described herein such as with respect to providing content as described herein.

Example implementations, in accordance with an embodiment, of the WD 22, network node 16 and host computer 24 discussed in the preceding paragraphs will now be described with reference to FIG. 3.

The communication system 10 includes a network operator node 17 provided in the communication system and including hardware 38 enabling it to communicate with the network node 16. The hardware 38 may include a communication interface 40 for communicating with one or more entities in communication system 10 such as with network node 16, UPF 113, SMF 110, PCF 105, Key Generation and Store entity, NEF 103, etc., which are generally known and described in the Background section but where one or more actions/signaling features have been modified and/or added as described herein in order to provide traffic management related functionality.

In the embodiment shown, the hardware 38 of the network node 16 further includes processing circuitry 42. The processing circuitry 42 may include a processor 48 and a memory 46. In particular, in addition to or instead of a processor, such as a central processing unit, and memory, the processing circuitry 42 may comprise integrated circuitry for processing and/or control, e.g., one or more processors and/or processor cores and/or Field Programmable Gate Arrays (FPGA) and/or Application Specific Integrated Circuitries (ASIC) adapted to execute instructions. The processor 48 may be configured to access, e.g., write to and/or read from, the memory 46, which may comprise any kind of volatile and/or non-volatile memory, e.g., cache and/or buffer memory and/or Random Access Memory (RAM) and/or Read-Only Memory (ROM) and/or optical memory and/or Erasable Programmable Read-Only Memory (EPROM).

Thus, the network operator node 17 further has software 50 stored internally in, for example, memory 46, or stored in external memory, e.g., database, storage array, network storage device, etc. accessible by the network operator node 17 via an external connection. The software 50 may be executable by the processing circuitry 42. The processing circuitry 42 may be configured to control any of the methods and/or processes described herein and/or to cause such methods, and/or processes to be performed, e.g., by network operator node 17. Processor 48 corresponds to one or more processors 48 for performing network operator node 17 functions described herein. The memory 46 may be a computer readable medium that is configured to store data, programmatic software code and/or other information described herein. In some embodiments, the software 50 may include instructions that, when executed by the processor 48 and/or processing circuitry 42, causes the processor 48 and/or processing circuitry 42 to perform the processes described herein with respect to network operator node 17. For example, processing circuitry 42 of the network operator node 17 may include TM unit 32 which is configured to perform one or more network operator node 17 functions as described herein such as with respect to traffic management when the traffic is encrypted using, for example, asymmetric encryption.

The communication system 10 further includes the content provider node 34 already referred to. The content provider node 34 may have hardware 52 that may include communication interface 54 configured to communicate with one or more entities in system 10 such as with network operator node 17, etc.

The hardware 52 of the content provider node 34 further includes processing circuitry 56. The processing circuitry 56 may include a processor 58 and memory 60. In particular, in addition to or instead of a processor, such as a central processing unit, and memory, the processing circuitry 56 may comprise integrated circuitry for processing and/or control, e.g., one or more processors and/or processor cores and/or FPGAs and/or ASICs adapted to execute instructions. The processor 58 may be configured to access, e.g., write to and/or read from, memory 60, which may comprise any kind of volatile and/or nonvolatile memory, e.g., cache and/or buffer memory and/or RAM and/or ROM and/or optical memory and/or EPROM.

Thus, the content provider node 34 may further comprise software 62, which is stored in, for example, memory 60 at the content provider node 34, or stored in external memory, e.g., database, storage array, network storage device, etc., accessible by the content provider node 34. The software 62 may be executable by the processing circuitry 56.

The processing circuitry 56 may be configured to control any of the methods and/or processes described herein and/or to cause such methods, and/or processes to be performed, e.g., by content provider node 34. The processor 58 corresponds to one or more processors 58 for performing content provider node 34 functions described herein. The content provider node 34 includes memory 60 that is configured to store data, programmatic software code and/or other information described herein. In some embodiments, the software 62 may include instructions that, when executed by the processor 58 and/or processing circuitry 56, causes the processor 58 and/or processing circuitry 56 to perform the processes described herein with respect to content provider node 34. For example, the processing circuitry 56 of the content provider node 34 may include content unit 36 which is configured to perform one or more content provider node 34 function as described herein such as with respect to traffic management when the traffic is encrypted using, for example, asymmetric encryption.

Figure 3:
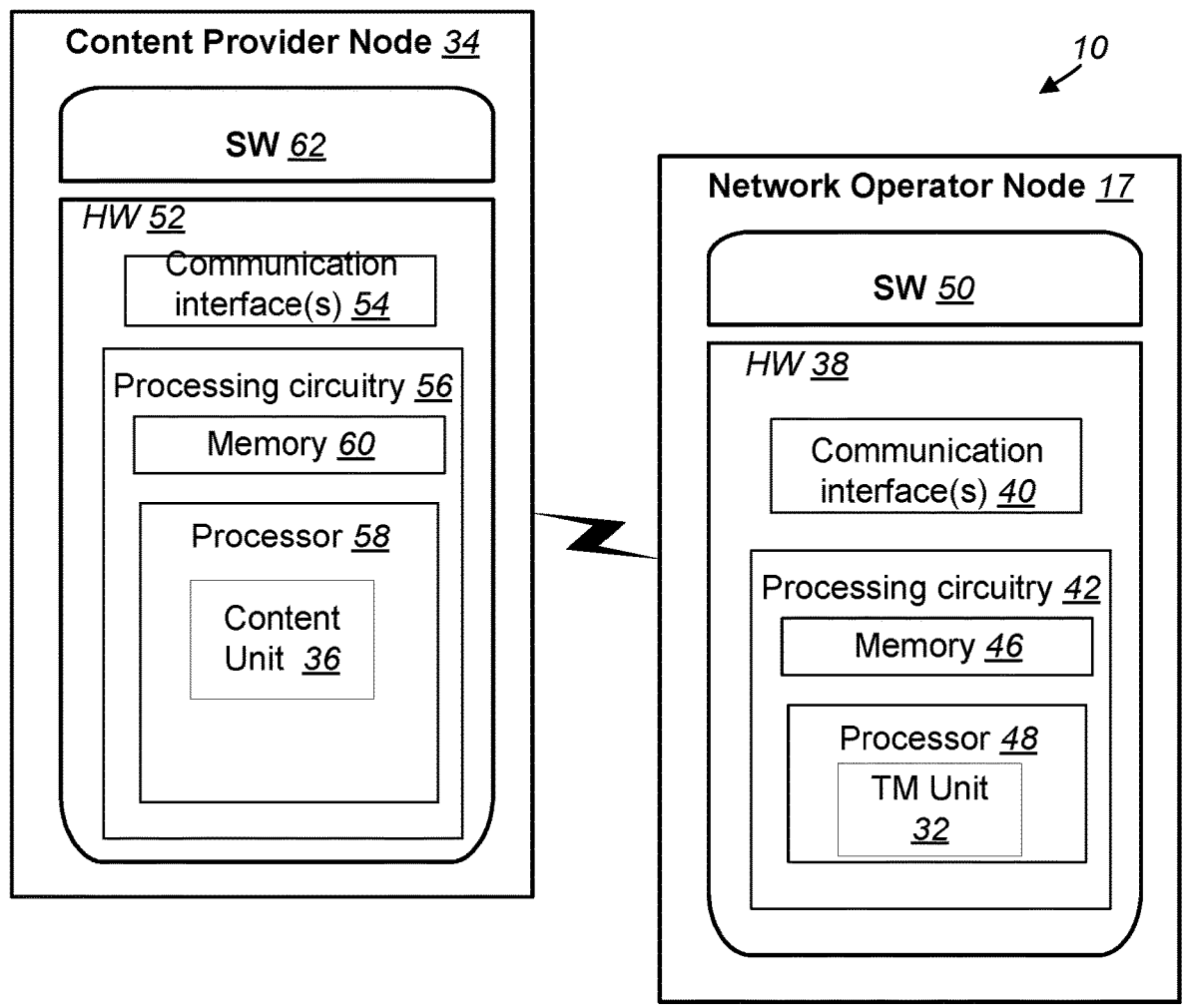
FIG. 3 is a block diagram of a portion of the communication system.

In some embodiments, the inner workings of network operator node 17 and content provider node 34 may be as shown in FIG. 3 and independently, the surrounding network topology may be that of FIG. 2.

Although FIGS. 2 and 3 show various "units" such as TM unit 32 and content unit 36 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 4:
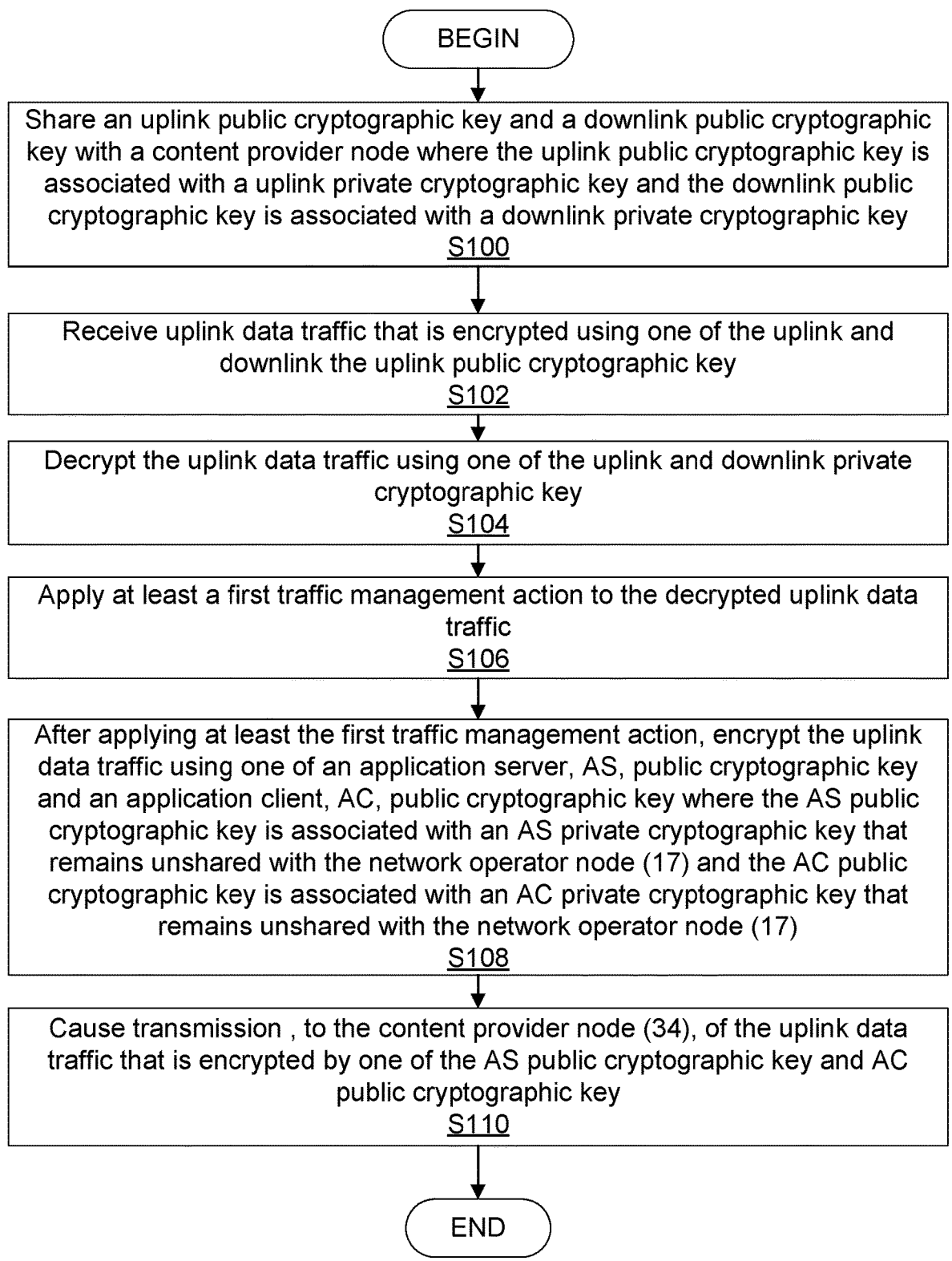
FIG. 4 is a flowchart of an example process in a network operator node.

FIG. 4 is a flowchart of an exemplary process in a network operator node 17 for traffic management when the traffic is encrypted using, for example, asymmetric encryption. One or more blocks described herein may be performed by one or more elements of network operator node 17 such as by one or more of processing circuitry 42, including the TM unit 32, processor 48, and/or communication interface 40. Further, while network operator node 17 is described in terms of a single entity below, network operator node 17 may correspond to one or more physical and/or logical entities in the network operator network 14 such as UPF 113, SMF 110, PCF 105, Key Generation and Store entity, NEF 103, etc. such that the signaling/actions performed by the network operator node 17, as described below, may be performed by one or more of these respective entities in the network operator network 14.

Network operator node 17 is configured to share (Block S100) an uplink public cryptographic key and a downlink public cryptographic key with a content provider node 34, the uplink public cryptographic key being associated with an uplink private cryptographic key, the downlink public cryptographic key being associated with a downlink private cryptographic key, as described herein. Network operator node 17 is configured to receive (Block S102) data traffic that is encrypted using one of the uplink and downlink public cryptographic key, as described herein.

Network operator node 17 is configured to decrypt (Block S104) the data traffic using one of the uplink and downlink private cryptographic key, as described herein. Network operator node 17 is configured to apply (Block S106) at least a first traffic management action to the decrypted data traffic, as described herein. Network operator node 17 is configured to after applying at least the first traffic management action, encrypt (Block S108) the data traffic using one of an AS public cryptographic key and an AC public cryptographic key, the AS public cryptographic key being associated with an AS private cryptographic key that remains unshared with the network operator node 17, the AC public cryptographic key being associated with an AC private cryptographic key that remains unshared with the network operator node 17, as described herein. Network operator node 17 is configured to cause transmission (Block S110) of the data traffic that is encrypted by one of the AS public cryptographic key and AC public cryptographic key, as described herein.

According to one or more embodiments, at least the first traffic management action is configured for the WD 22 for a predefined software application. According to one or more embodiments of this aspect, at least the first traffic management action includes modifying at least one of a property and content associated with the data traffic. According to one or more embodiments of this aspect, at least the first traffic management action includes at least one of content enrichment, parental control and redirection, content filtering and application-based charging and monitoring.

According to one or more embodiments, the processing circuitry 42 is further configured to receive, from the content provider node 34, a request for public cryptographic keys for performing at least the first traffic management action where the sharing of the uplink public cryptographic key and downlink public cryptographic key is performed based at least in part on the request for public cryptographic keys. According to one or more embodiments, the processing circuitry 42 is further configured to receive, from the content provider node 34, a request requiring the network operator node 17 to apply at least the first traffic management action where the request includes an AS cryptographic public key and an AC public cryptographic key. According to one or more embodiments of this aspect, the request to apply at least the first traffic management action is received after the request for the public cryptographic keys.

According to one or more embodiments, the processing circuitry 42 is further configured to receive an onboarding request from the content provider node 34 where the sharing of the uplink public cryptographic key and downlink public cryptographic key is performed based at least in part on the received onboarding request. According to one or more embodiments, the processing circuitry 42 is further configured to: receive a key request for an AS public cryptographic key and an AC public cryptographic key; send the key request to the content provider node 34 to generate the AS public cryptographic key and AC public cryptographic key; receive a response to the key request, the response including the AS public cryptographic key and AC public cryptographic key; and transmit the AS public cryptographic key and AC public cryptographic key to a key generation and store entity for retrieval. According to one or more embodiments of this aspect, the processing circuitry 42 is further configured to receive, from the content provider node 34, a request to apply at least the first traffic management action where the request includes an application identifier, WD identifier and an indication of at least the first traffic management action being requested.

According to one or more embodiments, the processing circuitry 42 is further configured to retrieve the downlink public cryptographic key, uplink public cryptographic key, AS public cryptographic key, AC public cryptographic key using the application identifier and WD identifier. According to one or more embodiments of this aspect, the network operator node 17 includes a UPF logical node, SMF logical node, PCF logical node, and a NEF logical node.

Figure 5:
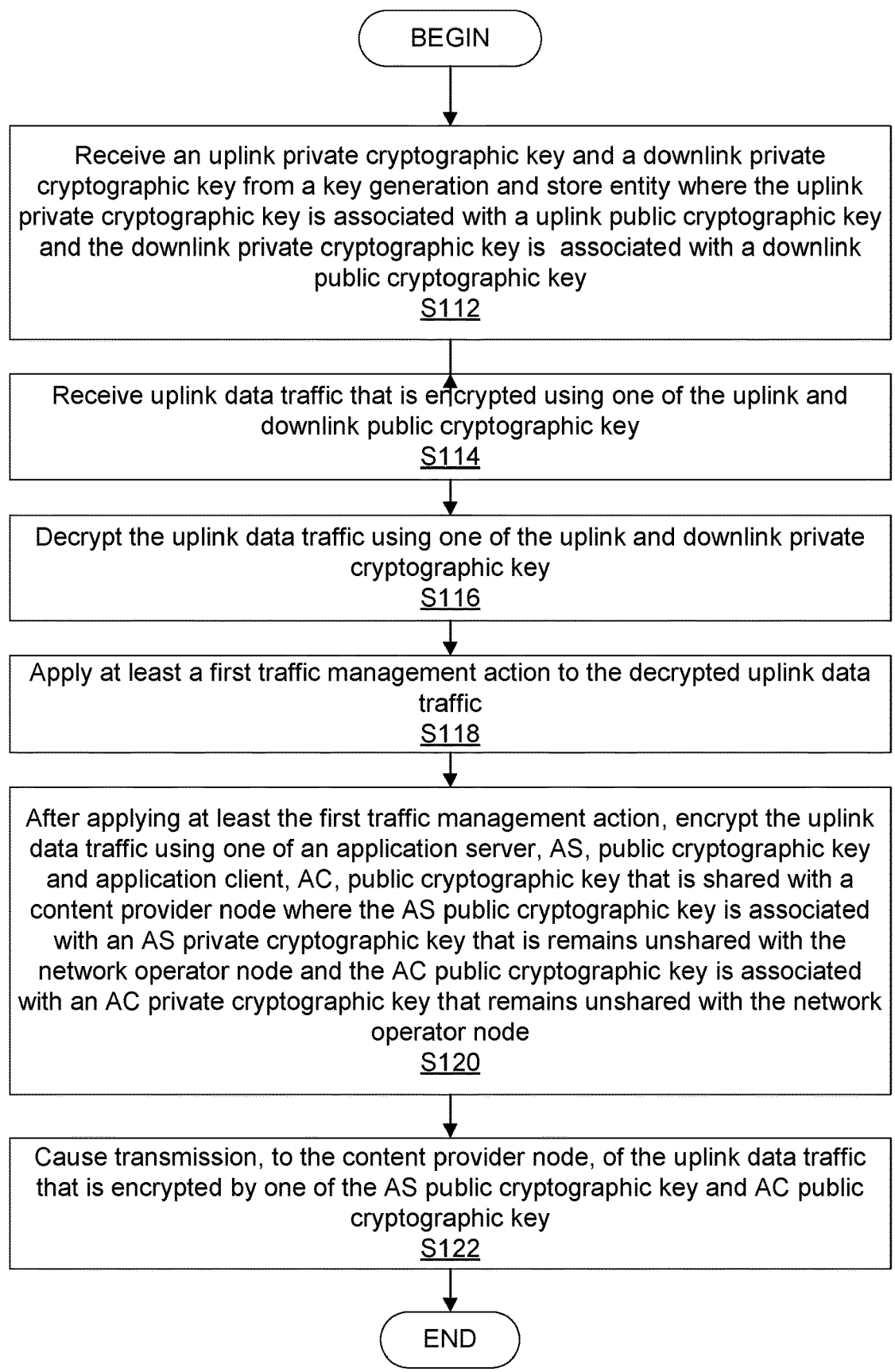
FIG. 5 is a flowchart of an example process in a UPF.

FIG. 5 is a flowchart of an exemplary process in a UPF 113. One or more blocks described herein may be performed by one or more elements of the UPF 113 such as by one or more of processing circuitry 42, including the TM unit 32, processor 48, and/or communication interface 40. Network operator node 17 is configured to receive (Block S112) an uplink private cryptographic key and a downlink private cryptographic key from a key generation and store entity where the uplink private cryptographic key is associated with an uplink public cryptographic key and the downlink private cryptographic key is associated with a downlink public cryptographic key, as described herein. Network operator node 17 is configured to receive (Block S114) data traffic that is encrypted using one of the uplink and downlink public cryptographic key, as described herein.

The UPF 113 is configured to decrypt (Block S116) the data traffic using one of the uplink and downlink private cryptographic key, as described herein. Network operator node 17 is configured to apply (Block S118) at least a first traffic management action to the decrypted data traffic, as described herein. The UPF 113 is configured to after applying at least the first traffic management action, encrypt (Block S120) the data traffic using one of an AS public cryptographic key and AC public cryptographic key that is shared with a content provider node 34 where the AS public cryptographic key is associated with an AS private cryptographic key that is remains unshared with the network operator node 17 and the AC public cryptographic key is associated with an AC private cryptographic key that remains unshared with the network operator node, as described herein. The UPF 113 is configured to cause (Block S122) transmission of the data traffic that is encrypted by one of the AS public cryptographic key and AC public cryptographic key, as described herein.

According to one or more embodiments of this aspect, at least the first traffic management action is configured for the WD 22 for a predefined software application. According to one or more embodiments of this aspect, the uplink public cryptographic key and the downlink public cryptographic key are shared with a content provider node 34. According to one or more embodiments of this aspect, at least the first traffic management action includes modifying at least one of a property and content associated with the data traffic. According to one or more embodiments of this aspect, at least the first traffic management action includes at least one of content enrichment, parental control and redirection, content filtering and application-based charging and monitoring.

Having described the general process flow of arrangements of the disclosure and having provided examples of hardware and software arrangements for implementing the processes and functions of the disclosure, the sections below provide details and examples of arrangements for traffic management when the traffic is encrypted using, for example, asymmetric encryption.

Having generally described arrangements for traffic management when the traffic is encrypted using, for example, asymmetric encryption, details for these arrangements, functions and processes are provided as follows, and which may be implemented by the network operator node 17 and/or content provider node 34. In particular, one or more functions, actions and/or signaling described below may be performed by network operator node 17 such as via processing circuitry 42, processor 48, TM unit 32, etc., or may be performed by content provider node 34 such as via processing circuitry 56, processor 58, content unit 36, etc., or may be performed by WD 22 or by a certificate authority entity such as a trusted third party.

One or more embodiments described herein are based on an extension of the exposure policy framework, specifically by the content provider, e.g. the AF, and network operator, e.g. the NEF, to exchange the public keys that are necessary to decrypt the traffic and enforce the TM actions. The collaborative solution described herein allows the network operator to detect the subscriber traffic for a certain application and to apply one or more corresponding traffic management actions, e.g., redirection, content enrichment, parental control, etc., in a simple and efficient way when the traffic is encrypted by using asymmetric encryption.

The type of traffic this solution applies to may include HTTP traffic. Possible use cases are, for example, HTTP content enrichment, where the network operator node 17 adds information, e.g., RAT Type, IMSI, MSISDN, towards the content provider, e.g. the AS, and HTTP redirection, e.g., redirecting towards a recharging service when the user's quota is exhausted. Another use case can be parental control, e.g., in order to block traffic to forbidden sites, e.g., web sites, applications, etc. One or more embodiments described herein may require HTTP proxy functionality, i.e., an intermediary node for HTTP traffic decrypting and encrypting traffic using different keys. One or more embodiments described herein may assume that the HTTP proxy functionality is performed by UPF 113, e.g., by means of internal UPF functionality, or implemented in a Service Function in a Service Function Chaining deployment.

Figure 6A:
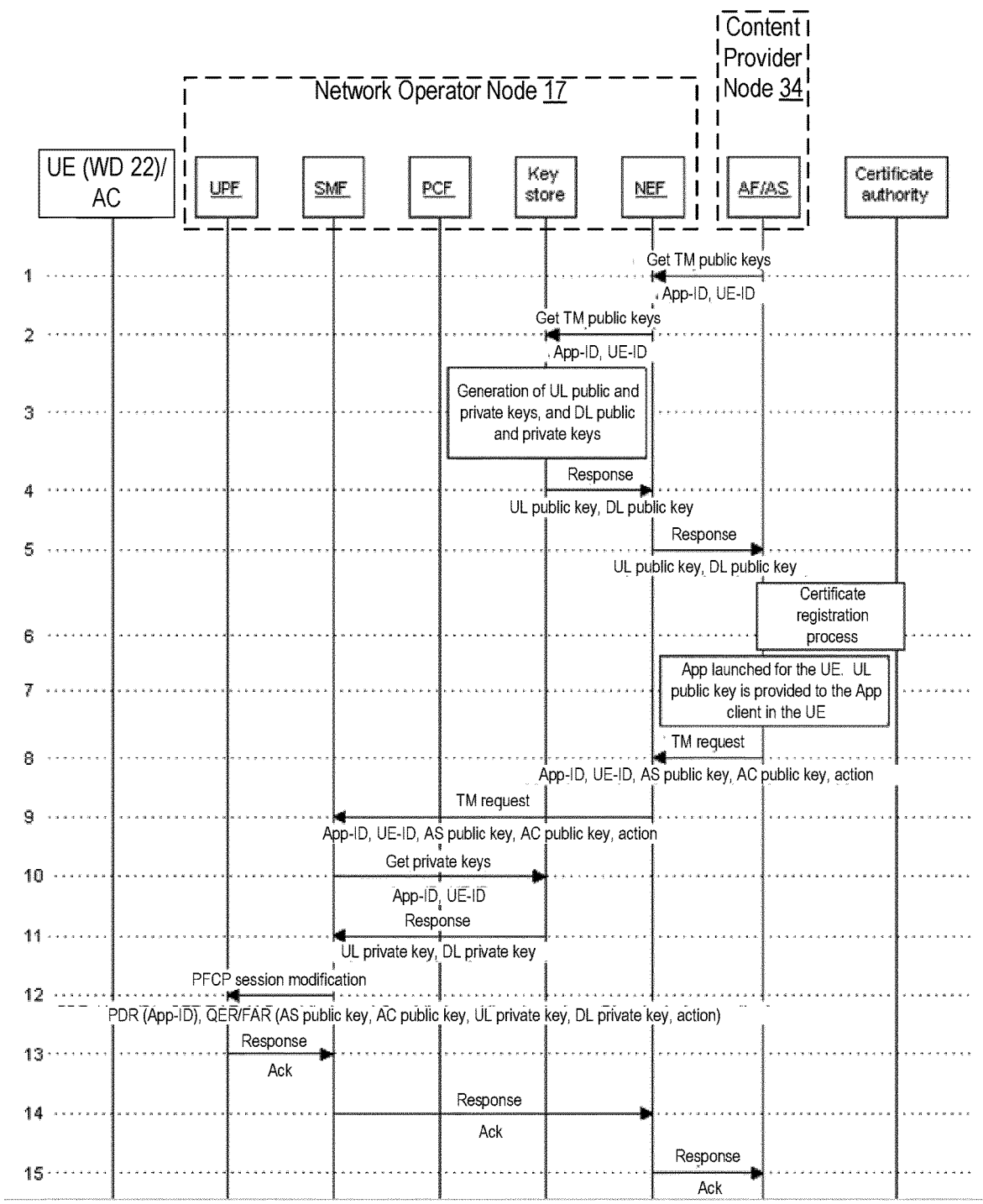
FIGS. 6a-b are signaling diagrams for an example process.
Figure 6B:
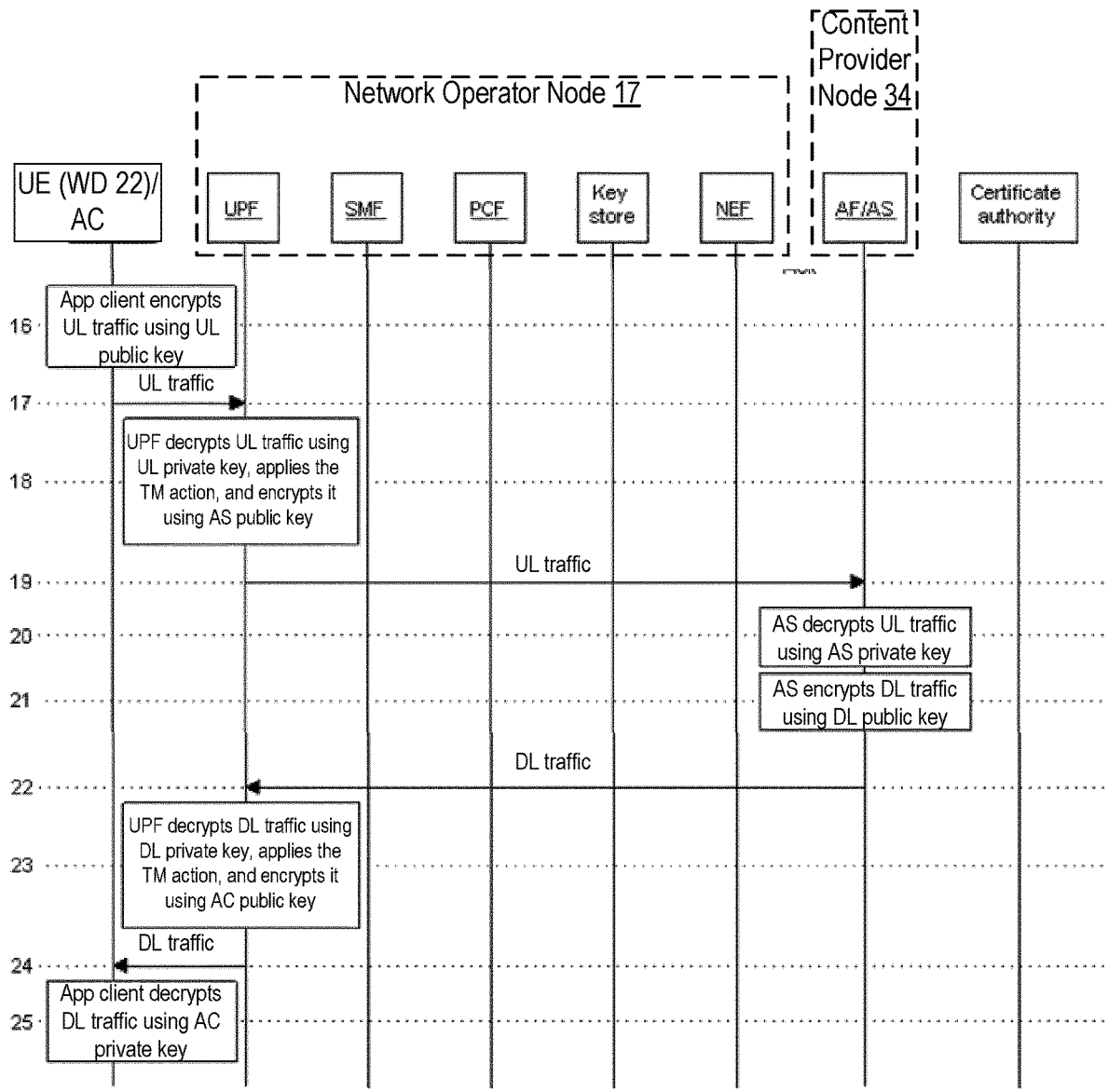

FIGS. 6a-b are a signaling diagram of the scenario in which the application, i.e., content provider node 34, side triggers the key generation procedures (performed in the operator side). As used herein, "new parameter" may refer to a parameter that has been added to signaling where such a parameter is not part of such signaling in existing system, where the parameter, itself, may be new or known in the field. The steps may include the following:

1. The AF requests to NEF 103 the public keys for TM actions for a UE-identifier (UE-ID) and Application identifier (App-ID).
2. The NEF 103 relays the request to the Key Generation and Store entity.
3. The Key Generation and Store entity generates the UL public and private keys, and DL public and private keys.
4. The Key Generation and Store entity responds to NEF 103 by including the UL public key and DL public key in the response.
5. The NEF 103 relays the response to the AF 101 where the response includes the UL public key and DL public key.
6. The certificate registration process with the Certificate Authority occurs. The application registers the UL public key and DL public key. The application registers with the certificate authority the corresponding certificates to encrypt the traffic, both UL, encrypted by the AC and DL, encrypted by the AS. Registering the public keys with the Certificate Authority helps ensure that there is no security or trust issues with the traffic encrypted by the application, since the keys are generated by the network operator node 17 in order to allow traffic decryption in the network operator domain/network 14 without exchanging private keys, e.g., without exchanging private keys with the content provider node 34.
7. An application is launched for the WD. The UL public key is provided to the Application client in the WD.
8. The AF 101 requests to NEF 103 a TM action that requires traffic visibility where the request includes:
    a. App-ID
    b. UE-ID
    c. AS public key—public key generated by the application for the operator to encrypt UL traffic towards the AS.
        Note: The registered certificate can be included in this message where the certificate includes the AS public key.
    d. AC public key—public key generated by the application for the operator to encrypt DL traffic towards the WD 22, i.e., WD running or operating the AC.
        Note: The registered certificate can be included in this message where the certificate includes the AC public key.
    e. Action—TM action, e.g., redirection, content enrichment, parental control, etc. For example, the TM action may modify a property associated with the data traffic, e.g., content, without modifying the content itself, or can modifying the content itself. A property may include a charge value or whether to charge for the content.
9. The NEF 103 sends the request to the SMF 110.
10. The SMF 110 retrieves the private keys for the App-ID and UE-ID from the Key Generation and Store entity.
11. The Key Generation and Store entity, also referred to as Key Store and/or KeyStore, responds to SMF 110 with the UL private key and DL private key.
    Note: The exchange of the UL/DL private keys inside the MNO (steps 11 and 12) is performed in a secure way by using an encrypted channel between KeyStore-SMF 110: e.g., using a service based interface between KeyStore and SMF 110, which already includes TLS in its protocol stack, in this step.
12. As there is an existing PDU session, the SMF 110 sends to UPF 113 a PFCP session modification message including:
    a. PDR, including the App-ID
    b. QER or FAR, including the action and New parameters: including AS public key, AC public key, UL private key, DL private key.
    Note: The exchange of the UL/DL private keys inside the MNO (steps 11 and 12) is performed in a secure way by using an encrypted channel between SMF-UPF: e.g., Enhancing N4 protocol stack to support TLS or QUIC in this step.
    Note: The registered certificates can be included in the modification message where the certificates include the AC public key and AS public key.
13. UPF 113 acknowledges (acks) the modification request.
14. SMF 110 acks the TM request.
15. NEF 103 acks the TM request.
16. App client encrypts UL traffic using UL public key.
17. Encrypted UL traffic is transmitted by the WD 22.
18. UPF 113 decrypts UL traffic using UL private key, applies the TM action, and encrypts the UL traffic, after application of the TM action, using AS public key.
19. Encrypted UL traffic, after application of the TM action, is transmitted by the WD 22.
20. AS decrypts UL traffic using AS private key.
21. AS encrypts DL traffic using DL public key.
22. Encrypted DL traffic is transmitted by the AF/AS 101.
23. UPF 113 decrypts DL traffic using DL private key, applies the TM action, and encrypts the DL traffic, after application of the TM action, using AC public key.
24. DL traffic, after application of the TM action, is transmitted by the UPF 113 to the WD 22.
25. App client at the WD 22 decrypts DL traffic using AC private key.

Figure 7A:
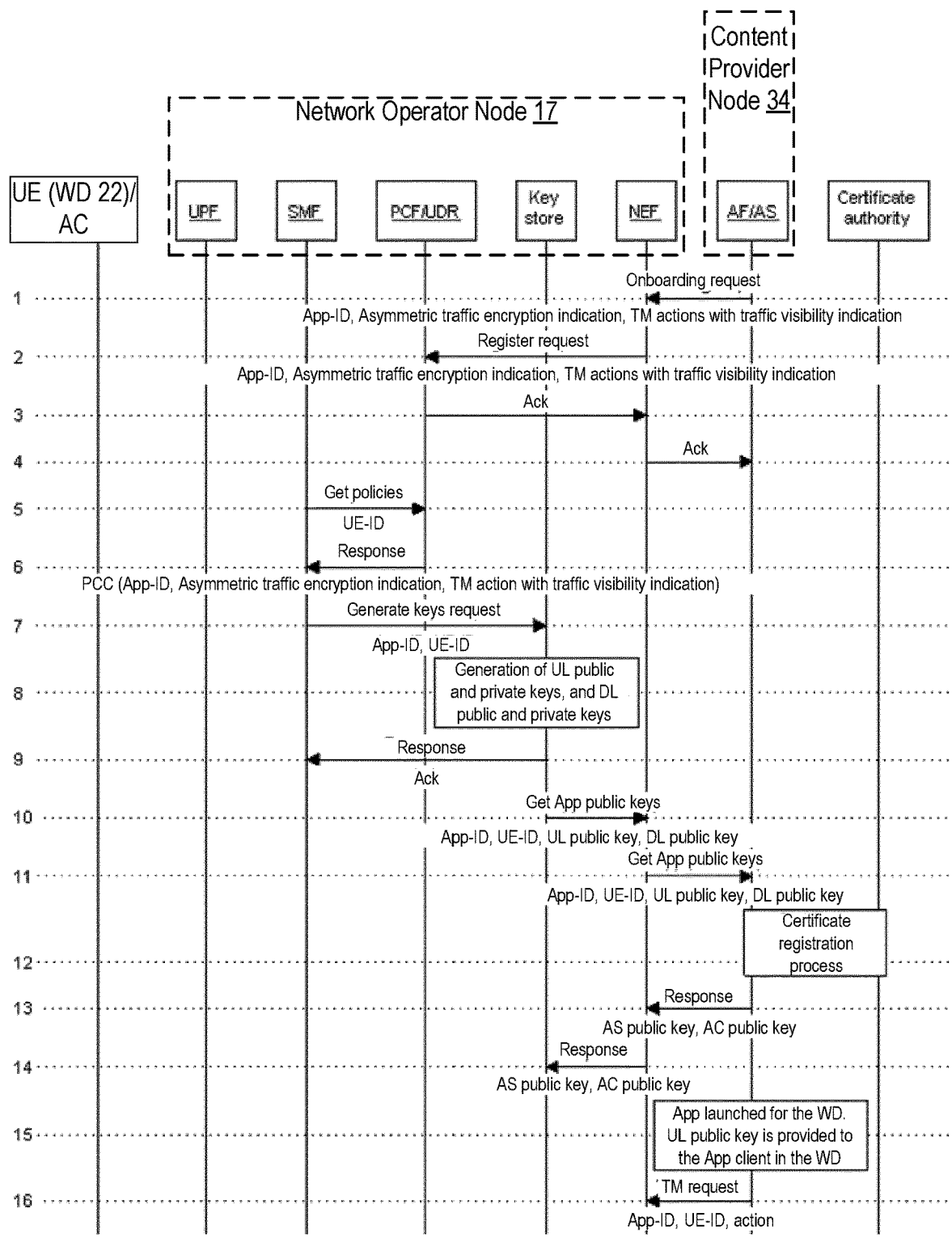
FIGS. 7a-b are signaling diagrams for another example process.
Figure 7B:
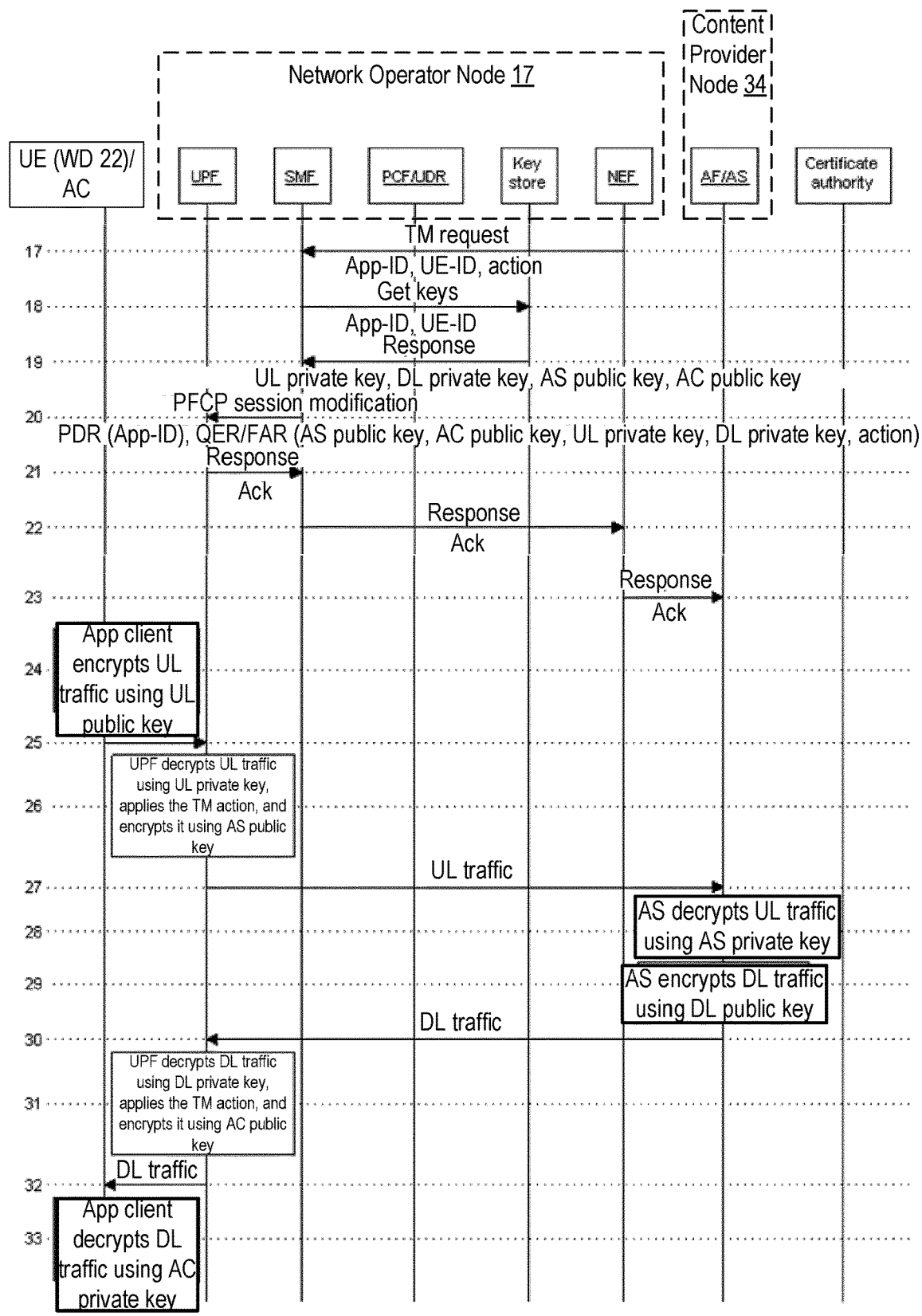

FIG. 7a-b is a signaling diagram of the scenario in which the network operator, i.e., network operator node 17, triggers the key generation procedures, e.g., at PDU session establishment. The steps are the following:

1. The AF 101 requests to onboard to NEF 103 where the AF 101 request includes:
    a. App-ID
    b. Asymmetric traffic encryption indication—indicates that the application encrypts traffic using asymmetric encryption
    c. TM actions with traffic visibility indication—indicates the application requires TM actions requiring traffic visibility at the network operator network 14.
2. The NEF 103 registers the above information in PCF/UDR 105. The Asymmetric traffic encryption indication and TM actions with traffic visibility indication are stored in the corresponding application's data for the App-ID.
3. PCF/UDR 105 acks the registration.
4. NEF 103 acks the onboard request.
5. At PDU session establishment, SMF 110 requests policies to PCF for a user-ID.
6. PCF 105 responds to SMF 110 with the PCC rules for an App-ID including the Asymmetric traffic encryption indication, a new parameter as defined herein, and TM actions with traffic visibility indication, i.e. a new parameter as defined herein, if existing for that application.

7. SMF 110 activates, in the Key Generation and Store entity, the key generation for the UE-ID and App-ID.
8. The Key Generation and Store entity generates the UL public and private keys, and DL public and private keys.
9. The Key Generation and Store entity responds to SMF 110 by acknowledging the key generation.
10. The Key Generation and Store entity sends to NEF 103 a request for the application keys including the App-ID, UE-ID, UL public key and DL public key.
11. The NEF 103 relays the request to the AF 101.
12. The certificate registration process with the Certificate Authority occurs. The application registers the UL public key and DL public key. The application registers with the certificate authority the corresponding certificates to encrypt the traffic, both UL, encrypted by the AC, and DL, encrypted by the AS. Registering the public keys with the Certificate Authority helps ensure that there is no security or trust issues with the traffic encrypted by the application, since the keys may be generated by the network operator node 17 in order to allow traffic decryption in the network operator domain/network 14 without exchanging private keys.
13. The AF 101 responds to the NEF 103 in which the response includes:
    a. AS public key—Public key generated by the application for the operator to encrypt UL traffic towards the AS.
    Note: The registered certificate can be included in this message where the certificate includes the AS public key.
    b. AC public key—Public key generated by the application for the operator to encrypt DL traffic towards the WD 22, e.g. AC.
    Note: The registered certificate can be included in this message where the certificate includes the AC public key.
14. The NEF 103 responds to the Key Generation and Store entity including the AS public key and AC public key.
    Note: The registered certificates can be included in this message where the certificates include the AS public key and AC public key.
15. An application (App) launched for the WD 22. The UL public key is provided to the App client (AC) in the WD 22.
16. The AF 101 requests to NEF 103 a TM action that requires traffic visibility where the request includes:
    a. App-ID
    b. UE-ID
    c. Action—TM action, e.g., redirection, content enrichment, parental control, etc.
17. The NEF 103 sends the request to the SMF 110.
18. The SMF 110 retrieves the keys for the App-ID and UE-ID from the Key Generation and Store entity.
19. The Key Generation and Store entity responds to SMF 110 with the UL private key, DL private key, AS public key and AC public key.
    Note: The exchange of the UL/DL private keys inside the MNO (steps 11 and 12) is performed in a secure way by using an encrypted channel between KeyStore-SMF: e.g., using a service based interface between KeyStore and SMF 110, which already includes TLS in its protocol stack, in this step
    Note: The registered certificates can be included in this message where the certificates include the AS public key and AC public key.
20. As there is an existing PDU session, the SMF 110 sends to UPF 113 a PFCP session modification message including:
    a. PDR, including the App-ID
    b. QER or FAR, including the action and new parameters described herein: including AS public key, AC public key, UL private key, DL private key
    Note: The exchange of the UL/DL private keys inside the MNO (steps 11 and 12) is performed in a secure way by using an encrypted channel between SMF-UPF: e.g., Enhancing N4 protocol stack to support TLS or QUIC in this step.
    Note: The registered certificates can be included in this message where the certificates include the AS public key and AC public key.
21. UPF 113 acks the modification request.
22. SMF 110 acks the TM request.
23. NEF 103 acks the TM request.
24. App client encrypts UL traffic using UL public key.
25. UL traffic is transmitted by WD 22.
26. UPF 113 decrypts UL traffic using UL private key, applies the TM action, and encrypts the UL traffic, after application of the TM action, using AS public key.
27. UL traffic, after application of the TM action, is transmitted by the UPF 113 to the AF/AS 101.
28. AS decrypts UL traffic using AS private key.
29. AS encrypts DL traffic using DL public key.
30. DL traffic is transmitted by the AS/AF 101.
31. UPF 113 decrypts DL traffic using DL private key, applies the TM action, and encrypts the DL traffic, after application of the TM action, using AC public key.
32. encrypted DL traffic, after application of the TM action, is transmitted to the WD 22, e.g. the AC.
33. App client decrypts DL traffic using AC private key.

Further, one or more embodiments described herein do not only apply to 5G network architecture, but the same mechanisms and teachings can be applied to 4G, by, for example, replacing:

AF 101 with SCS/AS

NEF 103 with SCEF

PCF 105 with PCRF

SMF 110 with PGW-C or TDF-C

UPF 113 with PGW-U or TDF-U

Further, in one or more embodiments, some of the signaling from FIGS. 6a-7b may be changed or vary from the depicted signaling while still adhering to the public/private cryptographic key mechanisms described herein.

Therefore, one or more embodiments described herein solve the above problems and are based on an extension (i.e., new features described herein) of the exposure policy framework. In one or more embodiments described herein, only public keys are exchanged among the different parties/entities/nodes. Private keys are never exchanged and are always kept by the owner i.e., network operator. This collaborative solution allows the network operator node 17 to detect and decrypt the subscriber traffic for a certain application and to apply one or more corresponding traffic management actions, e.g., redirection, content enrichment, parental control, etc., in a low complexity and efficient manner when the traffic is encrypted using asymmetric encryption.

| Abbreviation | Explanation |
| --- | --- |
| AF | Application Function |
| AMF | Access and Mobility Function |
| AS | Application Server |
| CP | Control Plane |
| CUPS | Control Plane User Plane Separation |
| DL | Downlink |
| DNS | Domain Name System |
| DoH | DNS over HTTPS |
| DoT | DNS over TLS |
| DPI | Deep Packet Inspection |
| FAR | Forwarding Action Rule |
| HTTP | Hypertext Transport Protocol |
| IE | Information Element |
| NEF | Network Exposure Function |
| NRF | Network Resource Function |
| PCF | Policy Control Function |
| PCRF | Policy and Charging Rule Function |
| PDN | Packet Data Network |
| PDR | Packet Detection Rule |
| PDU | Protocol Data Unit |
| PFCP | Packet Flow Control Protocol |
| PFD | Packet Flow Description |
| PGW | Packet Gateway |
| PGW-C | Packet Gateway Control Plane |
| PGW-U | Packet Gateway User Plane |
| QoS | Quality of Service |
| QUIC | Quick UDP Internet Connection |
| RAN | Radio Access Network |
| SCEF | Service Capability Exposure Function |
| SCS/AS | Service Capability Server/Application Server |
| SDF | Service Data Flow |
| SMF | Session Management Function |
| SSL | Secure Sockets Layer |
| SUPI | Subscription Permanent Identifier |
| TDF | Traffic Detection Function |
| TDF-C | Traffic Detection Function Control Plane |
| TDF-U | Traffic Detection Function User Plane |
| TLS | Transport Layer Security |
| TM | Traffic Management |
| UE | User Equipment |
| UL | Uplink |
| UP | User Plane |
| UPF | User Plane Function |
| URR | Usage Reporting Rule |

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network operator node configured to communicate with a wireless device, the network operator node comprising: processing circuitry configured to:
   share an uplink public cryptographic key and a downlink public cryptographic key with a content provider node, the uplink public cryptographic key being associated with an uplink private cryptographic key, the downlink public cryptographic key being associated with a downlink private cryptographic key;
   receive data traffic that is encrypted using one of the uplink public cryptographic key and the downlink public cryptographic key;
   decrypt the data traffic using one of the uplink public cryptographic key and the downlink private cryptographic key;
   apply at least a first traffic management action to the decrypted data traffic;
   after applying at least the first traffic management action, encrypt the data traffic using one of an application server, AS, the public cryptographic key and an application client, AC, public cryptographic key, the AS public cryptographic key being associated with an AS private cryptographic key that remains unshared with the network operator node, the AC public cryptographic key being associated with an AC private cryptographic key that remains unshared with the network operator node; and
   cause transmission of the data traffic that is encrypted by one of the AS public cryptographic key and AC public cryptographic key.

2. The network operator node of claim 1, wherein at least the first traffic management action is configured for the wireless device for a predefined software application.

3. The network operator node of claim 2, wherein at least the first traffic management action includes modifying at least one of a property and content associated with the data traffic.

4. The network operator node of claim 2, wherein at least the first traffic management action includes at least one of content enrichment, parental control and redirection, content filtering and application-based charging and monitoring.

5. The network operator node of claim 1, wherein the processing circuitry is further configured to receive, from the content provider node, a request for public cryptographic keys for performing at least the first traffic management action, the sharing of the uplink public cryptographic key and downlink public cryptographic key being performed based at least in part on the request for public cryptographic keys.

6. The network operator node of claim 5, wherein the processing circuitry is further configured to receive, from the content provider node, a request requiring the network operator node to apply at least the first traffic management action, the request including the AS, cryptographic public key and the AC public cryptographic key.

7. The network operator node of claim 6, wherein the request to apply at least the first traffic management action is received after the request for the public cryptographic keys.

8. The network operator node of claim 1, wherein the processing circuitry is further configured to receive an onboarding request from the content provider node, the sharing of the uplink public cryptographic key and downlink public cryptographic key being performed based at least in part on the received onboarding request.

9. A user plane function, UPF, node, that is part of a network operator node and configured to communicate with a wireless device, the UPF node comprising:
   processing circuitry configured to:
   receive an uplink private cryptographic key and a downlink private cryptographic key from a key generation and store entity, the uplink private cryptographic key being associated with an uplink public cryptographic key, the downlink private cryptographic key being associated with a downlink public cryptographic key;
   receive data traffic that is encrypted using one of the uplink public cryptographic key and the downlink public cryptographic key;
   decrypt the data traffic using one of the uplink public cryptographic key and the downlink private cryptographic key;
   apply at least a first traffic management action to the decrypted data traffic;
   after applying at least the first traffic management action, encrypt the data traffic using one of an application server, AS, public cryptographic key and an application client, AC, public cryptographic key that is shared with a content provider node, the AS public cryptographic key being associated with an AS private cryptographic key that is remains unshared with the network operator node, the AC public cryptographic key being associated with an AC private cryptographic key that remains unshared with the network operator node; and
   cause transmission of the data traffic that is encrypted by one of the AS public cryptographic key and the AC public cryptographic key.

10. The UPF node of claim 9, wherein at least the first traffic management action is configured for the wireless device for a predefined software application.

11. A method implemented by a network operator node that is configured to communicate with a wireless device, the method comprising:
   sharing an uplink public cryptographic key and a downlink public cryptographic key with a content provider node, the uplink public cryptographic key being associated with an uplink private cryptographic key, the downlink public cryptographic key being associated with a downlink private cryptographic key;
   receiving data traffic that is encrypted using one of the uplink downlink public cryptographic key and the downlink public cryptographic key;
   decrypting the data traffic using one of the uplink downlink public cryptographic key and the downlink private cryptographic key;
   applying at least a first traffic management action to the decrypted data traffic;
   after applying at least the first traffic management action, encrypting the data traffic using one of an application server, AS, public cryptographic key and application client, AC, public cryptographic key, the AS public cryptographic key being associated with an AS private cryptographic key that remains unshared with the network operator node, the AC public cryptographic key being associated with an AC private cryptographic key that remains unshared with the network operator node; and
   causing transmission of the data traffic that is encrypted by one of the AS public cryptographic key and the AC public cryptographic key.

12. The method of claim 11, wherein at least the first traffic management action is configured for the wireless device for a predefined software application.

13. The method of claim 12, wherein at least the first traffic management action includes modifying at least one of a property and content associated with the data traffic.

14. The method of claim 12, wherein at least the first traffic management action includes at least one of content enrichment, parental control and redirection, content filtering and application-based charging and monitoring.

15. The method of claim 11, further comprising receiving, from the content provider node, a request for public cryptographic keys for performing at least the first traffic management action, the sharing of the uplink public cryptographic key and the downlink public cryptographic key being performed based at least in part on the request for public cryptographic keys.

16. The method of claim 15, further comprising receiving, from the content provider node, a request requiring the network operator node to apply at least the first traffic management action, the request including the AS cryptographic public key and the AC public cryptographic key.

17. The method of claim 16, wherein the request to apply at least the first traffic management action is received after the request for the public cryptographic keys.

18. A method implemented by a user plane function, UPF, node, that is part of a network operator node and configured to communicate with a wireless device, the method comprising:

receiving an uplink private cryptographic key and a downlink private cryptographic key from a key generation and store entity, the uplink private cryptographic key being associated with an uplink public cryptographic key, the downlink private cryptographic key being associated with a downlink public cryptographic key;

receiving data traffic that is encrypted using one of the uplink public cryptographic key and the downlink public cryptographic key;

decrypting the data traffic using one of the uplink public cryptographic key and the downlink private cryptographic key;

applying at least a first traffic management action to the decrypted data traffic;

after applying at least the first traffic management action, encrypting the data traffic using one of an application server, AS, public cryptographic key and an application client, AC, public cryptographic key that is shared with a content provider node, the AS public cryptographic key being associated with an AS private cryptographic key that is remains unshared with the network operator node, the AC public cryptographic key being associated with an AC private cryptographic key that remains unshared with the network operator node; and causing transmission of the data traffic that is encrypted by one of the AS public cryptographic key and AC public cryptographic key.

19. The method of claim 18, wherein at least the first traffic management action is configured for the wireless device for a predefined software application.

* * * * *